(12) United States Patent
Harter et al.

(10) Patent No.: US 10,023,288 B2
(45) Date of Patent: Jul. 17, 2018

(54) AIRCRAFT DOOR MECHANISM WITH HANDLE ACTUATED DESCENDER

(71) Applicant: Honda Patents & Technologies North America, LLC, Torrance, CA (US)

(72) Inventors: Eugene Petit Harter, Summerfield, NC (US); Michael T. Hamilton, Kernersville, NC (US)

(73) Assignee: HONDA PATENTS & TECHNOLOGIES NORTH AMERICA, LLC, Torrance, CA (US)

( * ) Notice: Subject to any disclaimer, the term of this patent is extended or adjusted under 35 U.S.C. 154(b) by 917 days.

(21) Appl. No.: 13/664,215

(22) Filed: Oct. 30, 2012

(65) Prior Publication Data

US 2014/0117161 A1 May 1, 2014

(51) Int. Cl.
*B64C 1/14* (2006.01)
*B64D 11/00* (2006.01)

(52) U.S. Cl.
CPC ........ *B64C 1/1438* (2013.01); *B64D 11/0023* (2013.01)

(58) Field of Classification Search
CPC ..... E06B 7/18; E06B 7/20; E06B 7/21; E05C 17/44; B64C 1/1407; B64C 1/1423; B64C 1/1438; B64C 1/1461; B64D 11/0023
USPC ................ 244/129.5; 49/316, 317, 318, 321
See application file for complete search history.

(56) References Cited

U.S. PATENT DOCUMENTS

| | | | | |
|---|---|---|---|---|
| 1,907,799 A | * | 5/1933 | Hardtke | ......................... 49/210 |
| 1,928,056 A | * | 9/1933 | Holt et al. | ...................... 49/375 |
| 3,051,280 A | | 8/1962 | Bergman et al. | |
| 3,670,537 A | | 6/1972 | Horgan et al. | |
| 4,362,328 A | | 12/1982 | Techany et al. | |
| 4,597,549 A | | 7/1986 | Ryan | |
| 4,911,219 A | * | 3/1990 | Dalrymple | ..................... 160/118 |
| 4,989,808 A | * | 2/1991 | Spraggins et al. | .......... 244/118.5 |
| 6,167,937 B1 | * | 1/2001 | Williams | ........................ 160/40 |
| 6,186,444 B1 | * | 2/2001 | Steel | .......................... 244/129.5 |

(Continued)

FOREIGN PATENT DOCUMENTS

| | | |
|---|---|---|
| DE | 4012257 | 10/1991 |
| EP | 2202371 | 6/2010 |

(Continued)

OTHER PUBLICATIONS

Non-Provisional Patent Application entitled "Paneled Partition Having a Retractable Extension" U.S. Appl. No. 13/632,649, filed Oct. 1, 2012.

(Continued)

*Primary Examiner* — Tien Q Dinh
*Assistant Examiner* — Brady W Frazier
(74) *Attorney, Agent, or Firm* — Rankin, Hill & Clark LLP

(57) ABSTRACT

A door assembly for an aircraft includes a partition panel disposed laterally within a fuselage of the aircraft and a descender panel moveably secured to a lower end of the partition panel for selectively closing an aisle opening defined below the partition panel. The door assembly further includes a handle disposed on the partition panel that is operatively connected to the descender panel through a link mechanism such that rotation of the handle is translated into movement of the descender panel to move the descender panel between a retracted position and a deployed position.

17 Claims, 9 Drawing Sheets

(56) References Cited

U.S. PATENT DOCUMENTS

| | | | |
|---|---|---|---|
| 6,523,779 B1* | 2/2003 | Michel | 244/118.5 |
| 6,817,577 B2 | 11/2004 | Semprini | |
| D586,474 S * | 2/2009 | Tsay et al. | D25/48.3 |
| 8,038,100 B2 | 10/2011 | Osborne | |
| 2009/0078824 A1* | 3/2009 | Osborne et al. | 244/119 |
| 2011/0042517 A1 | 2/2011 | Depeige | |
| 2011/0094161 A1 | 4/2011 | Rees | |
| 2013/0019536 A1* | 1/2013 | Cabourg | B64C 1/1438 49/449 |
| 2013/0020369 A1* | 1/2013 | Ple | 225/1 |
| 2013/0020439 A1* | 1/2013 | Cabourg | B64C 1/1438 244/129.4 |
| 2013/0111835 A1* | 5/2013 | Harter et al. | 52/238.1 |

FOREIGN PATENT DOCUMENTS

| | | |
|---|---|---|
| EP | 2578788 | 4/2013 |
| JP | 2011001755 | 2/2010 |

OTHER PUBLICATIONS

International Search Report and Written Opinion of PCT/US2013/062754 dated Mar. 18, 2014.
Extended European Search Report of EP Application No. 13 850 470.9 dated May 6, 2016, 7 pages.
Japanese Office Action of S/N 2015-539610 dated Jul. 25, 2017, 3 pages.

* cited by examiner

AIRCRAFT DOOR MECHANISM WITH HANDLE ACTUATED DESCENDER

BACKGROUND

Many aircrafts use one or more bulkheads (i.e., partitions) or curtains to screen a cabin. If an aircraft uses a bulkhead in its cabin, a door opening with a lateral slide type door could be provided in association with the bulkhead to allow passengers to get through the bulkhead. In many cases, the level of aisle way in a smaller aircraft (e.g., light jet) is lower than the level of a seating area floor because having a lower aisle way provides maximum headroom and is easier for passengers to move in the cabin. In this case, there will be a large opening at the bottom of the door due to the aisle way even if the doors are closed. To obstruct the large opening, descenders are sometimes used in some smaller aircraft in association with one or more slide type doors disposed laterally within the bulkhead of the aircraft. Such descenders are useful to preserve passengers' privacy and to reduce noise in the cabin. The descender can take the form of one or more panels that covers the large opening disposed below the slide type doors.

For example, in one application, one or more bulkhead doors are provided to close an opening defined between a pair of spaced apart fixed solid bulkheads within the aircraft fuselage. The fuselage is generally circular in cross-section with the fixed solid bulkheads protruding radially inward from the fuselage. The one or more doors can close the door opening defined between the fixed solid bulkheads. Typically, this is done by employing sliding doors that converge together when closed from positions recessed within or adjacent the fixed solid bulkheads.

Known descenders include so-called automatic rotary descenders. These are actuated mechanically when the door to which the descender is associated is slidably moved. For example, when the door is open, the descender rotates at the bottom of the door in a plane generally parallel with the door and opens the aisle opening automatically in response to the movement of the door; when the door is closed, the descender rotates at the bottom of the door again in the plan generally parallel with the door and closes the aisle opening automatically in response to the movement of the door.

In one specific known automatic rotary style descender, the descender is forced to rotate by being pressed on a carpet edge provided or defining the aisle opening in response to the movement of the door when the door is opened. The descender is stored in the interspace of the door in response to the movement of the door. In another known arrangement, cables are used to rotate and store the descender in a particular path as the door is opened. These rotary arrangements are relatively complex and therefore expensive. In particular, there are often space restrictions and issues with reliability of deployment for the so-called automatic rotary style descenders. The rotating style requires significant amounts of space to store the descender in the door and the descenders require large gaps for clearance purposes because head of each descender is easy to interfere each other when they are rotating. This means that it is difficult to obstruct the opening of the aisle way tightly with the traditional automatic rotary style descenders. In addition, the cable actuated style easily jams or malfunctions and operation is not always smooth.

SUMMARY

According to one aspect, a door assembly for an aircraft includes a partition panel disposed laterally within a fuselage of the aircraft and a descender panel moveably secured to a lower end of the partition panel for selectively closing an aisle opening defined below the partition panel. The door assembly further includes a handle disposed on the partition panel that is operatively connected to the descender panel through a link mechanism such that rotation of the handle is translated into linear movement of the descender panel to move the descender panel between a retracted position and a deployed position.

According to another aspect, an aircraft door assembly includes first and second rigid partitions disposed laterally within an aircraft fuselage and first and second descender panels moveably associated respectively with the first and second rigid partitions for closing an aisle opening defined below the first and second rigid partitions when the first and second rigid partitions are closed together. The aircraft door assembly further includes first and second actuating handles rotatably mounted respectively on the first and second partition panels. The first handle is operatively connected to the first descender panel through a first link mechanism to translate rotation of the first handle into linear vertical movement of the first descender panel. The second handle is operatively connected to the second descender panel through a second link mechanism to translate rotation of the second handle into linear vertical movement of the second descender panel.

According to a further aspect, an aircraft door mechanism includes an actuating handle rotatably mounted on a partition panel laterally disposed within a fuselage of an aircraft, a descender panel slidably mounted on the partition panel, and a link mechanism operatively connecting the actuating handle and the descender panel such that rotation of the handle is translated by the link mechanism to sliding movement of the descender panel.

DETAILED DESCRIPTION

Figure 1:
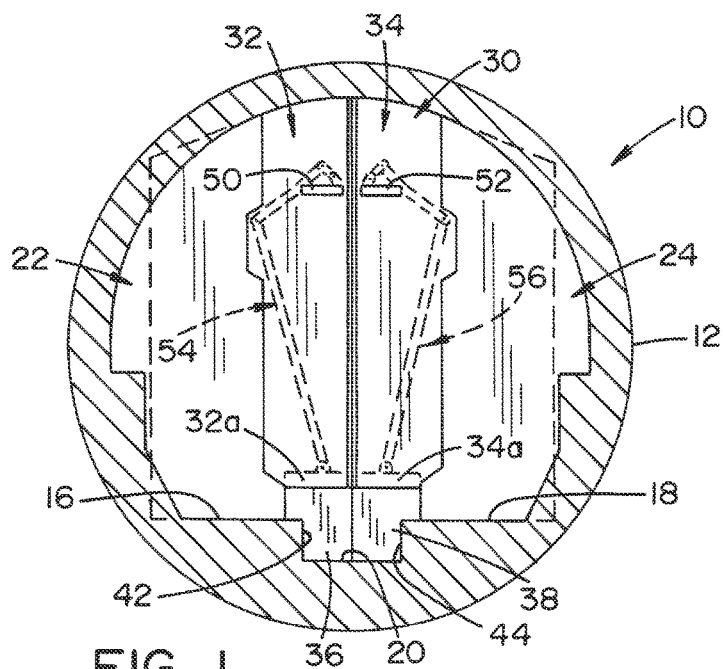
FIG. 1 is a schematic cross-sectional view of an aircraft fuselage having a door assembly with slidably disposed partition panels and descender panels shown in respective deployed positions according one exemplary embodiment.
Figure 2:
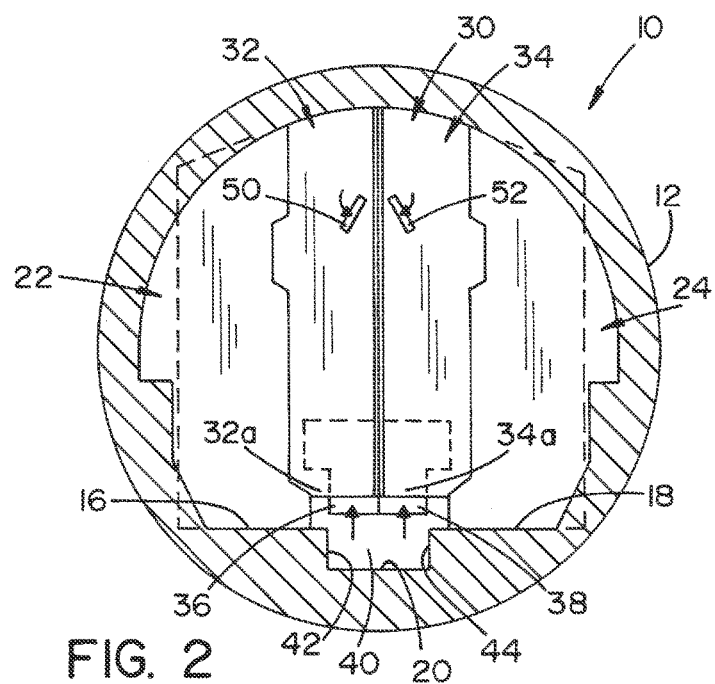
FIG. 2 is a schematic cross-sectional view similar to FIG. 1 but showing the descender panels moving toward respective retracted positions.

Referring now to the drawings wherein the showings are for purposes of illustrating one or more exemplary embodiments and not for purposes of limiting same, FIGS. 1-4 illustrate an aircraft 10 having an aircraft fuselage 12 with a generally circular cross-section. Within the fuselage 12, a cabin area 14 (FIGS. 3 and 4) is defined. As shown, a lower extent of the cabin area 14 can be defined by seating area floor portions 16, 18 and an aisle floor portion 20 disposed between the seating area floor portions 16, 18. In particular, the aisle floor portion 20 is disposed at an elevation below the seating area floor portions 16, 18, which provides increased head room within the cabin area 14 at the location of the aisle floor portion 20. In the illustrated location within the fuselage 12, fixed bulkheads 22, 24 project radially inwardly (e.g., along the seating area floor portions 16, 18) towards a central region of the cabin area 14 (i.e., disposed above the aisle floor portion 20) from lateral sides of the fuselage 12 to define a doorway or passageway 26 aligned with the aisle floor portion 20. In one example, the fixed bulkheads 22, 24 separate a cabin area of the fuselage from a lavatory area of the fuselage, though this is not required.

For closing the passageway 26, an aircraft door assembly 30 is provided with first and second rigid partitions or partition panels 32, 34. The partition panels 32, 34 are disposed laterally within the fuselage 12 for sliding movement toward one another when the partition panels 32, 34 are moved to respective closed positions (shown in FIG. 1) and sliding movement away from one another when the partition panels 32, 34 are moved to respective open positions. That is, the partition panels 32, 34 are arranged so as to extend and move laterally across the cabin area 14 defined by the fuselage 12 (i.e., generally perpendicular relative to an axis of the fuselage 12). Accordingly, and is known and understood by those skilled in the art, the partition panels 32, 34 are each slidably disposed within the fuselage 12 for lateral movement (and slight vertical movement) relative to the fuselage 12 between respective closed positions (shown in FIG. 1) and respective open positions (shown in FIG. 4). When the door assembly 30, and particularly the partition panels thereof, are displaced toward the open positions, the partition panels 32, 34 are retracted laterally outwardly relative to the fuselage 12, and particularly relative to the aisle floor portion 20, and also slightly vertically downward to accommodate for the round cross-section of the fuselage 12.

On the other hand, when the door assembly 30, and particularly the partition panels 32, 34, are displaced toward the closed positions, the partition panels 32, 34 are moved laterally inwardly relative to the fuselage 12, and particularly relative to the aisle floor portion 20, and also slightly vertically upward to again accommodate for the round cross-section of the fuselage 12. More specifically, and as best shown in FIG. 5 with regard to the partition panel 32, the partition panels 32, 34 can be arranged on tracks 62, 64 and movement of the panels occurs slightly vertically in addition to laterally (i.e., movement within the fuselage 12 occurs slightly obliquely) to accommodate the circular shape of the fuselage 12. The tracks 62, 64 can be fixedly mounted on the bulkhead 22. As shown schematically in dashed lines in FIGS. 1-4, the fuselage 12 can include recesses for accommodating the partition panels 32, 34 when in the respective open positions.

The door assembly 30 additionally includes first and second descender panels 36, 38 moveably associated respectively with the first and second partition panels 32, 34 for closing an aisle opening 40 defined below the partition panels 32, 34 when the partition panels 32, 34 are closed together. More particularly, the aisle opening 40 is defined immediately above the aisle floor portion 20 and laterally between vertical floor portions 42, 44 extending from the aisle floor portion 20, respectively, to the seating area floor portions 16, 18. The first descender panel 36 is slidably mounted or secured on the first partition panel 32 and the second descender panel 38 is slidably mounted or secured on the second partition panel 34. Accordingly, and as shown, the first descender panel 36 is moveably secured to a lower end 32a of the first partition panel 32 and the second descender panel 38 is moveably secured to a lower end 34a of the second partition panel 34. Both descender panels 36, 38 can close the aisle opening selectively and independently. Thus, when the partition panels 32, 34 are closed, the aisle opening 40 is closed up in addition to other apertures being closed up between the fuselage 12 and the partition panels 30, 32 because of the shape of the partition panels 32, 34 and the descender panels fits to the inner shape of the fuselage 12. As shown, each of the descender panels 34, 36 can be complementarily shaped to fit a shape of the aisle opening 40 within the fuselage 40. That is, no clearance gaps are provided about an entire periphery of the descender panels 34, 36 and the periphery of each descender panel 34, 36 closely follows the contours of the aisle floor portion 20 and the vertical floor portions 42, 44.

The door assembly 30 additionally includes first and second actuating handles 50, 52 rotatably mounted respectively on the first and second partition panels 32, 34. As will be described in more detail below, the first handle 50 is operatively connected to the first descender panel 36 through a first link mechanism 54 to translate rotation of the first handle 50 into vertical movement (e.g., vertical linear movement) of the first descender panel 36. Likewise, the second handle 52 is operatively connected to the descender panel 38 through a second link mechanism 56 to translate rotation of the second handle 52 into vertical movement (e.g., vertical linear movement) of the second descender panel 38. Additionally, and as will also be described in more detail below, the door assembly 30 can further include first and second trimming edges 58, 60 mounted respectively on inside lateral edges 32b, 34b of the first and second partition panels 32, 34. Each of the first and second trimming edges 58, 60 can define a track that guides movement of a corresponding one of the first and second descender panels 36, 38 (e.g., linearly up and down). The track will be described in further detail below. Advantageously, and as will also be described in more detail below, the descender panels 36, 38 do not interfere with one another when moving between the deployed and the retracted positions due to their respective linear paths of movement, particularly linearly up and down in the illustrated embodiment.

Figure 3:
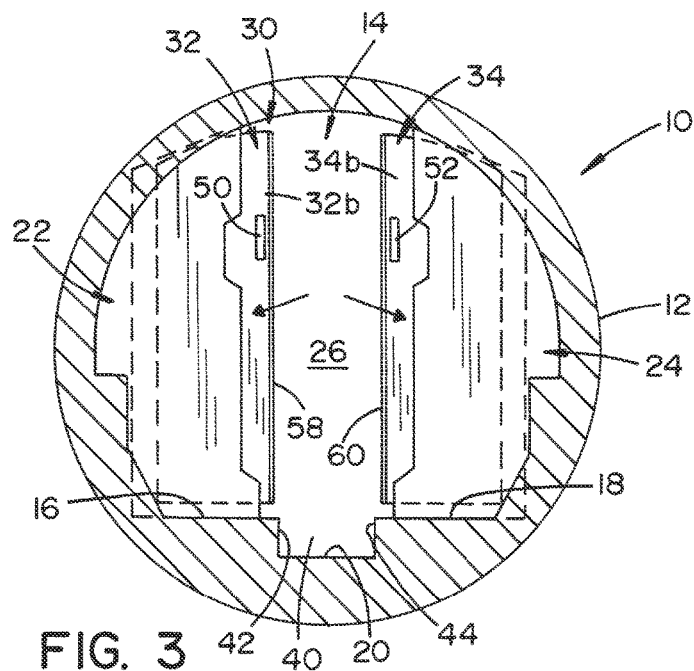
FIG. 3 is a schematic cross-sectional view similar to FIGS. 1 and 2 but showing the partition panels slidably moving apart from one another to provide access through a door opening.
Figure 4:
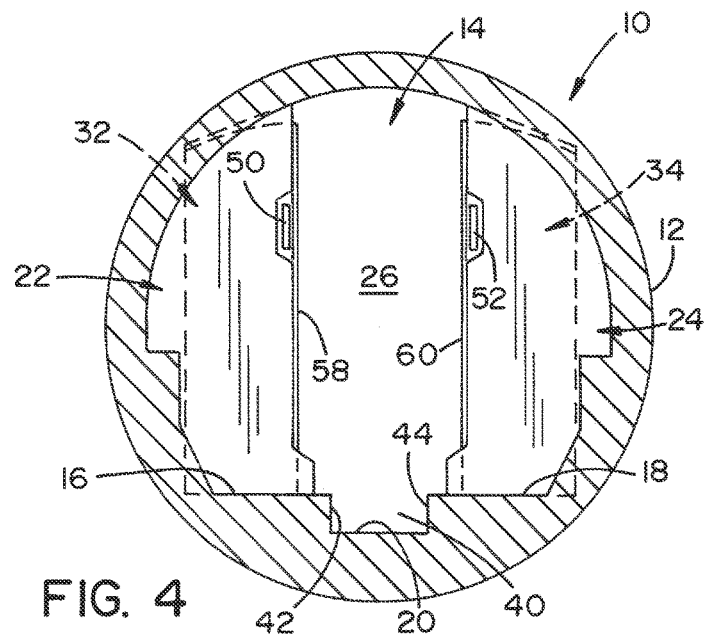
FIG. 4 is a schematic cross-sectional view similar to FIGS. 1-3 but showing the partition panels in fully opened positions.
Figure 5:
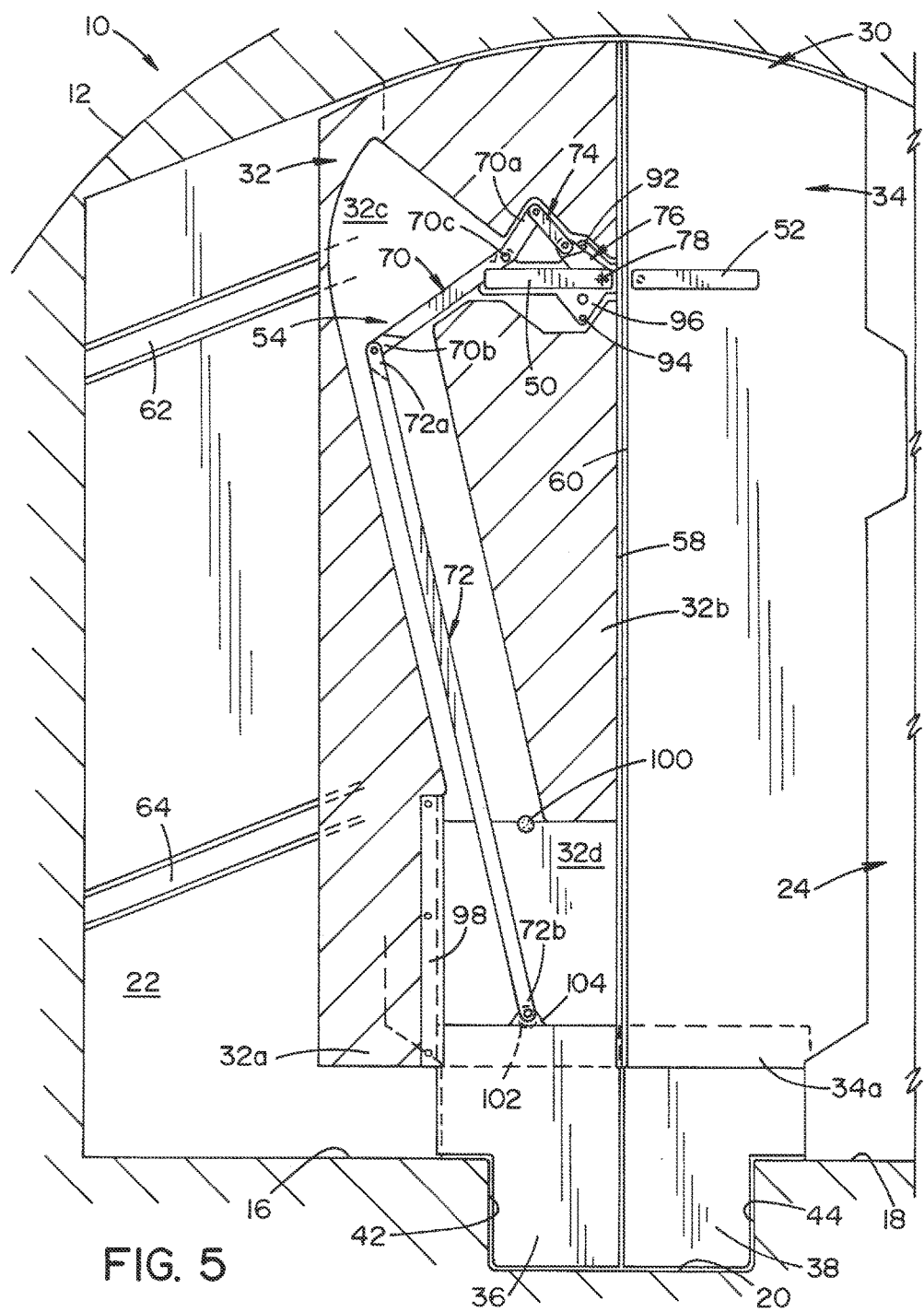
FIG. 5 is another schematic cross-sectional view but showing one of the partition panels in cross-section to reveal a link mechanism operatively connecting a handle of the partition panel to the descender panel.

The first and second handles 50, 52 are independently rotatable between first rotatable positions (shown in FIG. 1) and second rotatable positions (shown in FIGS. 3 and 4). In the illustrated embodiment, the first rotatable positions include orienting the handles 50, 52 horizontally and the second rotatable positions include orienting the handles 50, 52 vertically, though this is not required. Thus, in the illustrated embodiment, when rotated simultaneously, which is not required, the first and second handles 50, 52 can start from horizontally oriented positions of FIG. 1 so that the handles 50, 52 are collinear with one another and then rotated to the vertically oriented positions of FIGS. 3 and 4 so that the handles 50, 52 are parallel with and spaced apart from one another. As shown, the first rotatable positions for the handles 50, 52 correspond to deployed positions for the first and second descender panels 36, 38 the second rotatable positions for the handles 50, 52 correspond to retracted positions for the first and second descender panels 36, 38.

When the handles 50, 52 are rotated to the second rotatable positions, the first and second mechanisms 54, 56 pull the first and second descender panels 36, 38 upward (shown in FIG. 2) and the first and the second partition panels 32, 34 can be moved laterally toward their respective open positions (shown in FIG. 3 and FIG. 4). It is to be appreciated by those skilled in the art that other orientations for the handles 50, 52 could be used (e.g., the handles 50, 52 could start in vertical positions when the descender panels 36, 38 are deployed or some other first angular orientation and could be moved to horizontal positions when the descender panels 36, 38 are retracted or to some other second angular orientation). Also, though not shown in the illustrated embodiment, it is to be understood and appreciated that handles corresponding to the handles 50, 52 can also be provided a reverse side of the partition panels 32, 34 to allow operation of the partition panels 32, 34 from either side (e.g., a cabin side and a lavatory side of the partition panels 32, 34).

With reference now to FIGS. 5-10, the first partition panel 32, the first descender 36, the handle 50 and the link mechanism 54 associated with the first partition panel 32 will be described in particular detail. As will be appreciated and understood by those skilled in the art, the second partition panel 34, the second descender 38, the second handle 52 and the second link mechanism 56 can be mirrored copies and thus include corresponding components and operate the same as the first partition panel 32, the first descender 36, the first handle 50 and the first link mechanism 54. As shown in FIG. 5, the first partition panel 32 is slidably mounted on the track members 62, 64 for lateral sliding movement across the fuselage 12. In particular, the track members 62, 64 are arranged to allow sliding movement both laterally and slightly vertically. Accordingly, when the first partition panel 32 is moved from the closed position to the open position, the first partition panel 32 moves laterally outwardly and slightly vertically downwardly, as guided by the track members 62, 64.

The first link mechanism 54 operatively connects the actuating handle 50 and the descender panel 36 such that rotation of the handle 50 is translated by the first link mechanism 54 to sliding movement of the descender panel 36 (e.g., vertically or up and down in the figures). More particularly, the handle 50 is operatively connected to the descender panel 36 through the first link mechanism 54 such that rotation of the handle 50 is translated into movement of the descender panel 36 to move the descender panel 36 between the retracted position and the deployed position. In the illustrated embodiment, the first link mechanism 54 is received within a cavity 32c defined by the first partition panel 32. More particularly, and with brief reference to FIG. 7, the first partition panel 32 can be formed as a core member 32e in which the cavity 32c is defined, particularly in one side thereof, that houses or accommodates the first link mechanism 54 and an outer plate 32f that overlays the core member 32e on the side in which the cavity 32c is defined for closing the cavity 32c and covering the first link mechanism 54 (i.e., the first link mechanism 54 is not visible in the illustrated embodiment). The thickness of the core panel 32f can be relatively thin and thus the cavity 32e, which has a depth less than a thickness of the core panel 32e can be formed as a thin hollow.

The link mechanism 54 can include a rocker arm link 70 having a first end 70a, a second end 70b and a fixed pivot axis or location 70c, wherein the rocker arm link 70 is fixably and pivotably connected to the partition panel 32, and an elongated link 72 having a first end 72a and a second end 72b. The first end 72a of the elongated link 72 is rotatably connected to the second end 70b of the rocker arm link 70 and the second end 72b of the elongated link 72 is rotatably connected to the descender panel 36. The first end 70a of the rocker arm link 70 is operatively connected to the handle 50 such that rotation of the handle 50 rotates the rocker arm link 70 about the fixed pivot location 70c to thereby vertically move (and only linearly move in the illustrated embodiment) the elongated link 72 and the descender panel 36 connected thereto.

The link mechanism 54 can further include a floating link 74 having a first end 74a rotatably connected to the handle 50 such that rotation of the handle 50 moves the first end 74a of the floating link 74, and a second end 74b rotatably connected to the first end 70a of the rocker arm link 70 to transmit rotational movement of the handle 50 into rotational movement of the rocker arm link 70 about the fixed pivot point 70c. The link mechanism 54 can still further include a link driver 76 fixedly mounted or secured to the handle 50 for pivotal rotation therewith. The first end 74a of the floating link 74 is rotatably connected to a distal 76a of the link driver 76. In the illustrated embodiment, the link driver 76 is a link that projects or extends from the handle 50 and has the distal end 76a spaced apart from a pivot axis or location 78 of the handle 50 (i.e., the pivotal location 78 being the location at which the handle 50 is rotatably mounted to the partition panel 32).

As mentioned, the handle 50 is rotatable between the first rotatable position (shown in FIGS. 5 and 7) corresponding to the deployed position of the first descender panel 36 and the second rotatable position (shown in FIGS. 6 and 9) corresponding to the retracted position of the first descender panel 36. In the illustrated embodiment, the handle 50 is arranged so as to be horizontal when in the first rotatable position and is arranged to be vertical when in the second rotatable position, though this is not required and other angular orientations can be used for each of the first and second rotatable positions. At least one magnet (e.g., magnet 88 and/or 90) can be arranged on the partition panel 32 so that the first link mechanism 54, and particularly the link driver 76 thereof, moves relative to the at least one magnet 88 and/or 90 as the handle 50 is rotated and the first link mechanism 54 moves due to such handle rotation. The link driver 76 can be arranged so as to be aligned with the at least one magnet (e.g., magnet 88 and/or 90) for magnetic holding by the at least one magnet when the first descender panel 36 is in at least one of the retracted or the deployed position.

More particularly, in the illustrated embodiment, the link driver 76 is formed of a magnetically attractive material (e.g., steel) and the first partition panel 32 includes the first magnet 88 and the second magnet 90. The link driver 76 moves relative to the first and second magnets 88, 90 as the handle 50 is rotated and the link assembly 54 moves due to such handle rotation. The first magnet 88 is arranged such that the first magnet 88 is aligned with the link driver 76 when the descender panel 36 is in the deployed position of FIG. 5. The second magnet 90 is arranged such that the second magnet 90 is aligned with the link driver 76 when the descender panel 36 is in the retracted position of FIG. 6 and a magnetic attraction between the second magnet 90 and the link driver 76 holds the handle 50 in the second rotatable position.

In addition to the magnet 90 applying a holding force that maintains the descender panel 36 in the retracted position against the urging of gravity and/or any bias provided by the link mechanism 54, the magnets 88,90 also provide feedback regarding the position of the handle 50 when a user rotates the handle 50. More particularly, movement of the handle 50 into either the first or second rotatable position is confirmed to a user by the magnetic force between the first magnet 88 and the link driver 76 or between the second magnet 90 and the link driver 76. In one embodiment, the magnets 88, 90 are high strength magnets that provide a suitable holding force when aligned or in registry with link driver 76 and/or provide a positive locking feel when the handle 50 is in one of the first or second rotatable positions (i.e., provide feedback to the operator of the handle 50).

In addition to the magnets or without the magnets, stops 92, 94 can be arranged on the partition panel 36, 38 to limit rotational travel of the handle 50. In particular, the stops 92, 94 can limit rotational movement of the handle 50 between the first and second rotatable positions and thus prevent rotatably movement of the handle 50 beyond the first and second rotatable positions. In one embodiment, the stops are non-metallic (e.g., formed of plastic, resin, etc.) such that any sound created by the link driver 76 engaging or striking the stops 92, 94 and is reduced and/or minimized.

A mounting bracket 96 can be fastened to the partition panel 32. The mounting bracket 96 can have the handle 50 rotatably mounted thereto at the pivot location 78. Likewise, the rocker arm link 70 can be mounted to the bracket 96 at the fixed pivot location 70c. Additionally, the first and second magnets 88, 90 can be disposed on the mounting bracket 96. Likewise, the stops 92, 94 can be disposed on the mounting bracket 96. The bracket 96 can be fastened to the partition panel 32 using any suitable fasteners, e.g., bolts, rivets, etc.

Figure 8:
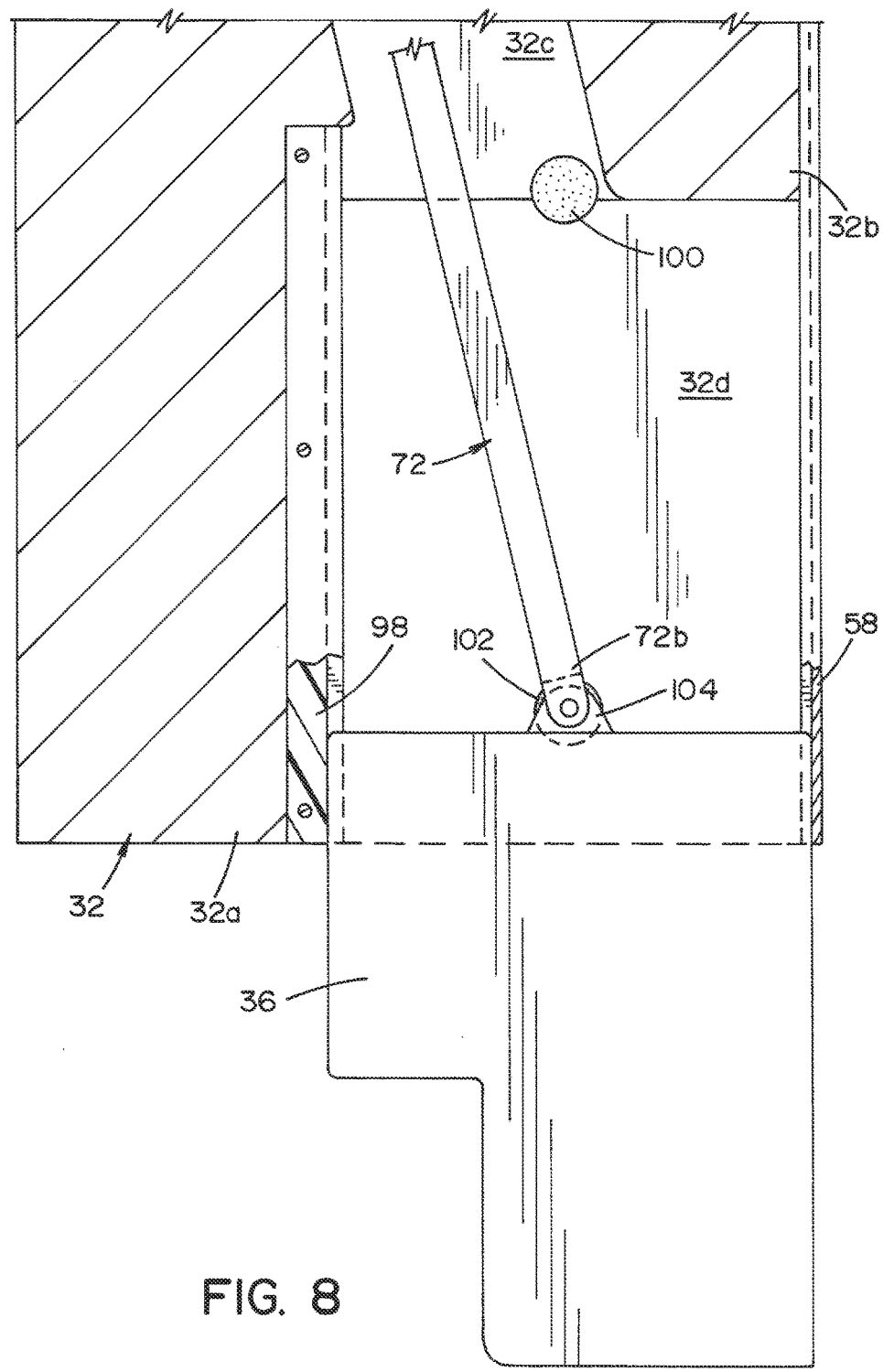
FIG. 8 is a partial enlarged cross-sectional view showing the descender panel moving within a track defined by the partition panel of FIGS. 5-7.
Figure 10:
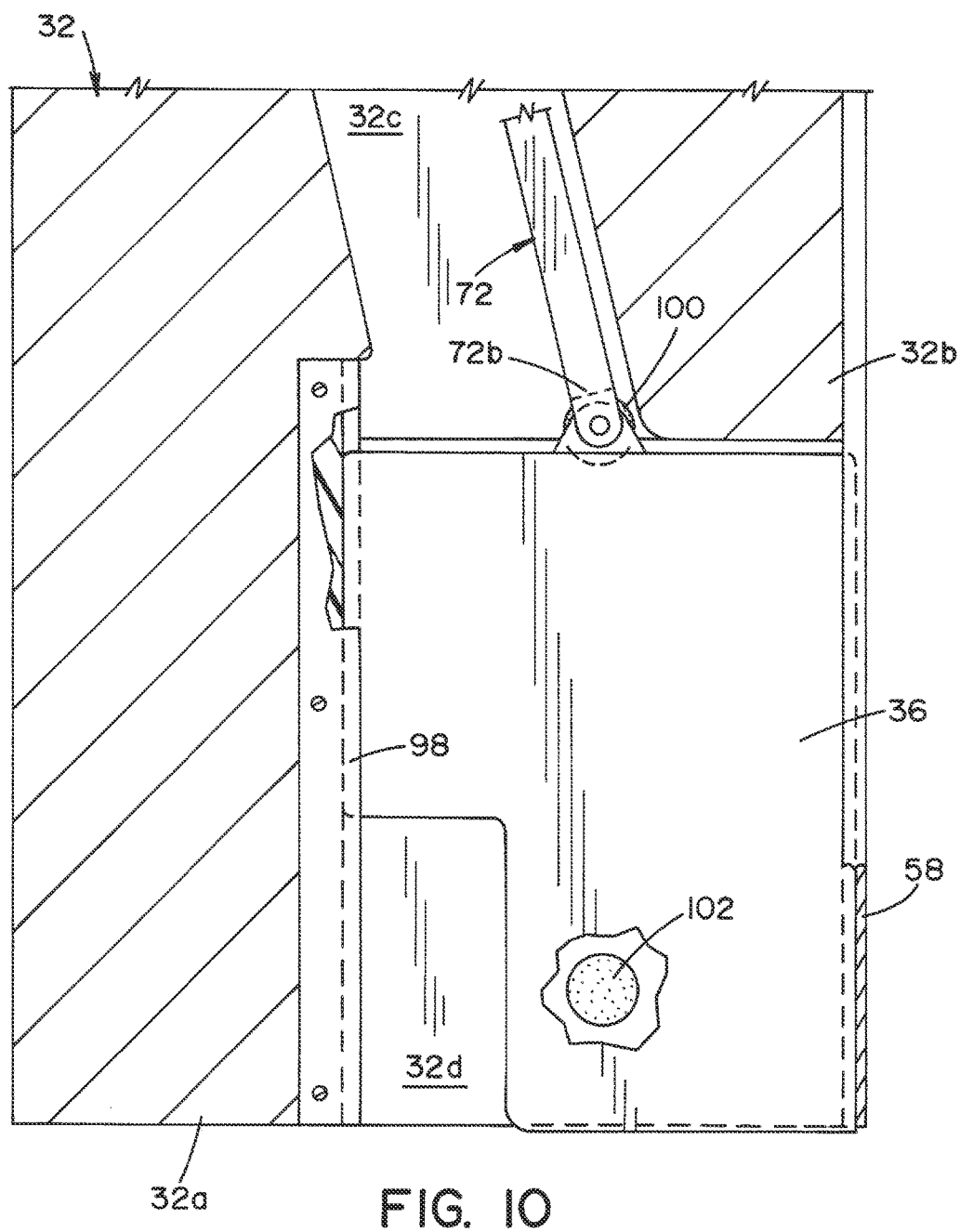
FIG. 10 is a partial enlarged cross-sectional view similar to FIG. 8 but showing the descender panel in the retracted position.

The trimming edge 58 covers the inside lateral edge 32b as best shown in FIGS. 8 and 10. Additionally, and as mentioned, the trimming edge 58 defines the track in which the descender panel 36 moves, particularly the trimming edge 58 defines one side of the track in which the descender panel 36 moves. The partition panel 32, and particularly the rigid core panel 32e thereof, can additionally define a descender panel cavity 32d in the form of a thin hollow in which the descender panel 36 is received when in the retracted position. The partition panel 36 can further include a guide member 98 appropriately spaced laterally from the trimming edge 58. The guide member 98 can further define the track. Particularly the guide member 98 defines a second side of the track in which the descender panel 36 is received and guided for sliding movement (e.g., linearly in the illustrated embodiment). Accordingly, through the trimming edge 58 and the guide member 98, the partition panel 32 defines the track and the descender panel 36 is received in the track for guiding linear sliding movement of the descender panel 36 between the retracted and deployed positions.

In the illustrated embodiment, at least one magnet (e.g., first magnet 100 and/or second magnet 102) is disposed on the partition panel 32 and a magnetically attractive boss 104 disposed on the descender panel 36 for movement with the descender panel 36. The magnetically attractive boss 104 moves relative to the at least one magnet (e.g., first magnet 100 and/or second magnet 102) as the descender panel 36 moves between the retracted position and the deployed position. The magnetically attractive boss 104 is in registry with the at least one magnet (e.g., first magnet 100 and/or second magnet 102), and therefore restricted with the at least one magnet, when the descender panel 36 is in at least one of the deployed position or the retracted position. More particularly, in the illustrated embodiment, the door assembly 30 includes both the first magnet 100 and the second magnet 102 on the descender panel 36, though only one magnet or no magnets could be employed. The magnetic attraction between the boss 104 and the first magnet 104 can hold the descender panel 36 in the retracted position. Likewise, the magnetic attraction between the boss 104 and the second magnet 102 can hold the descender panel 36 in the deployed position.

Figure 11:
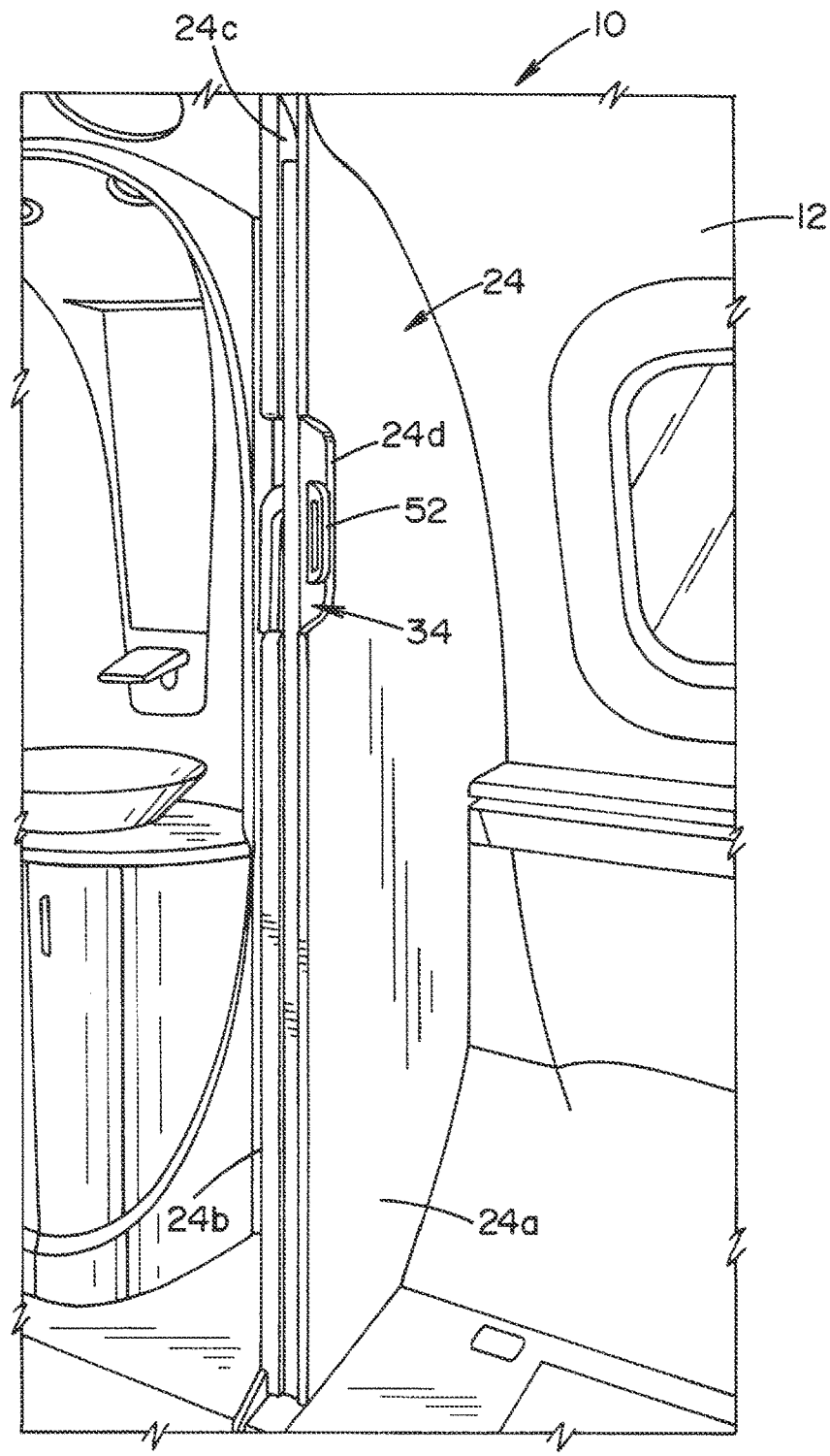
FIG. 11 is a partial perspective view of one of the partition panels slidably received within a pocket formed in a bulkhead of the aircraft fuselage.

With additional reference to FIG. 11, the positional relationship between the bulkhead 24 and the second partition panel 34 is illustrated and will now be described in particular detail. As will be appreciated and understood by those skilled in the art, the details concerning the bulkhead 24 and the second partition panel 34 are applicable to the bulkhead 22 and the first partition panel 22 since these can be mirrored copies of one another. As shown, the bulkhead 24 can be formed of a pair of spaced apart panel members 24a, 24b defining a pocket 24c therebetween in which the second partition panel 34 is received when in the open position. Thus, the second partition panel 34 is sandwiched between the two panel members 24a, 24b. Track members (not shown) for guiding movement of the second partition panel 34 (e.g., tracks members like the track members 62, 64 for the first partition panel 32) can be specifically mounted to the panel member 24b. As shown, the bulkhead panel 24a can include a cut-out edge 24d for accommodating the handle 52 when the second partition panel 34 is in the open position.

Figure 6:
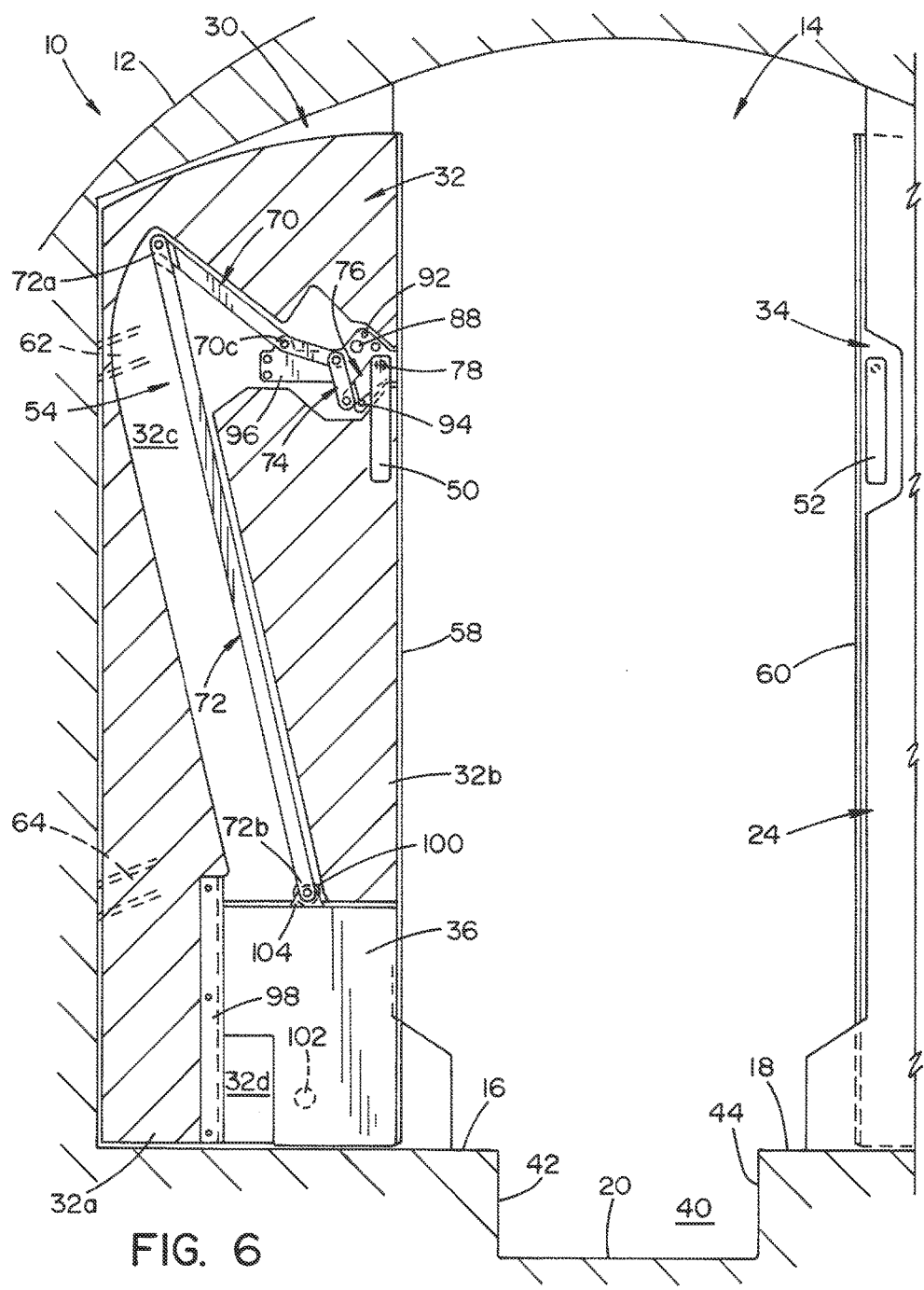
FIG. 6 is a view similar to FIG. 5 but showing the descender in the retracted position and the partition panel in the slide open position.
Figure 7:
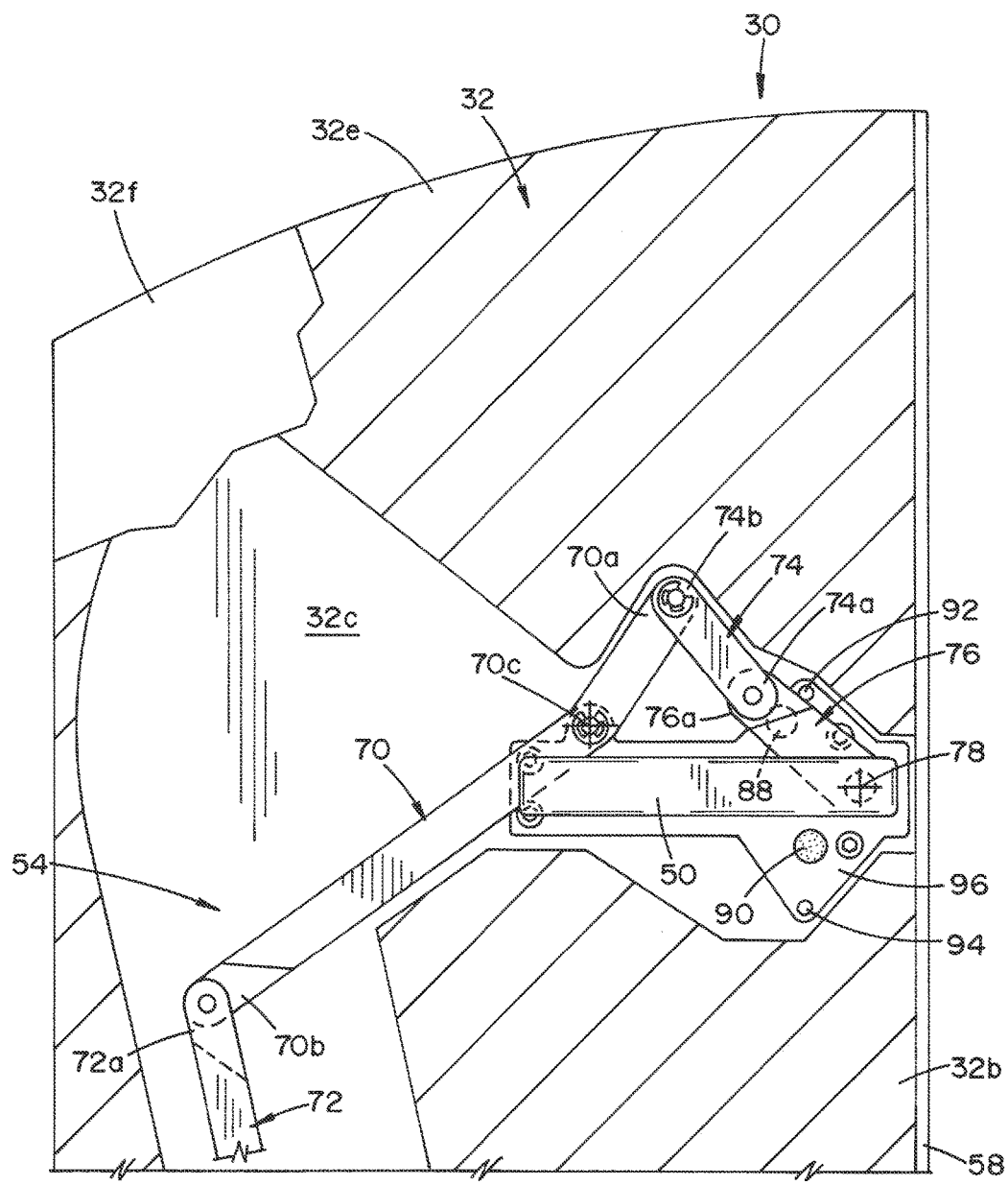
FIG. 7 is a partial enlarged cross-sectional view of the partition panel of FIGS. 5 and 6 showing the link mechanism when the handle is rotated to move the descender panel into the retracted position.
Figure 9:
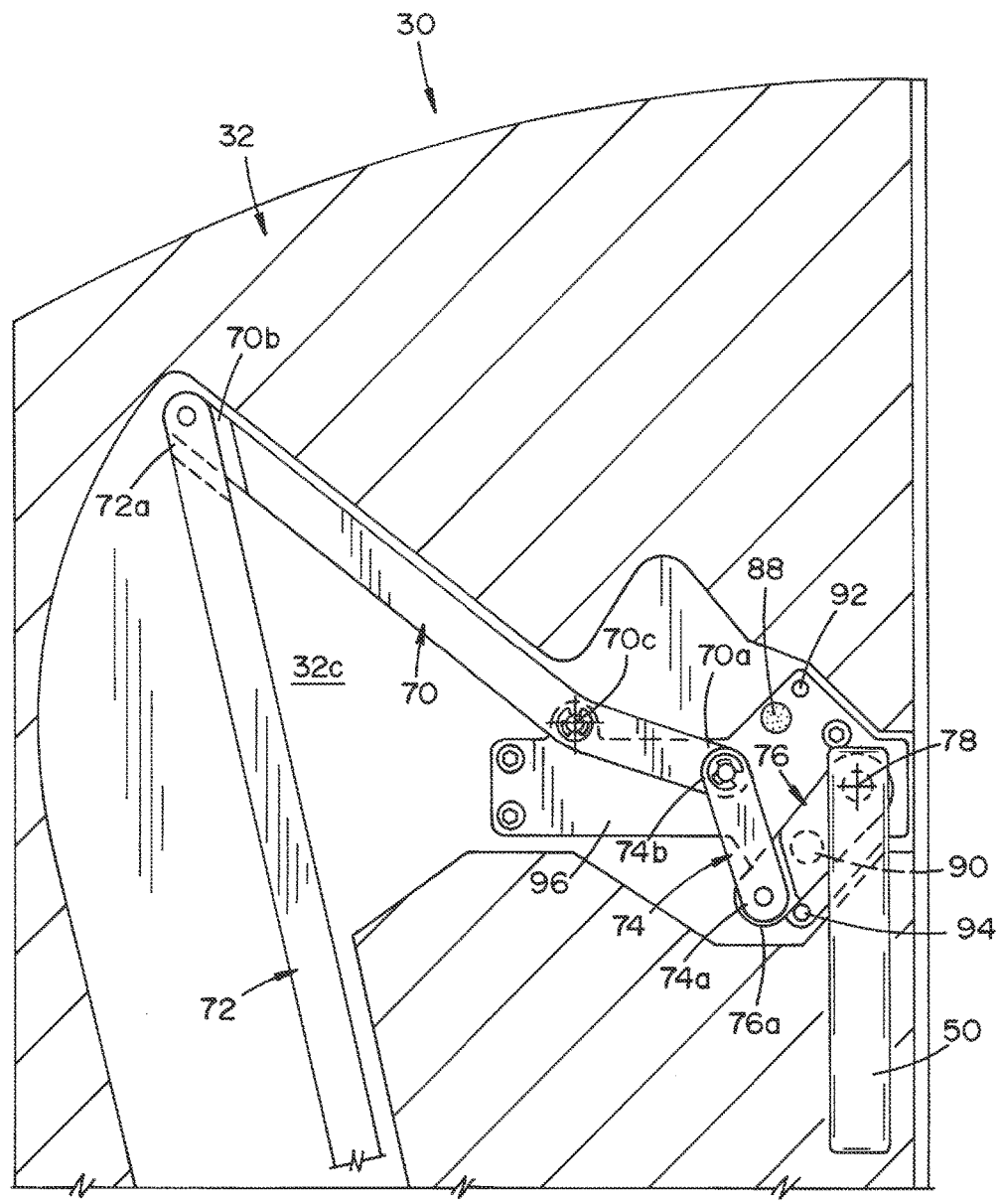
FIG. 9 is a partial enlarged cross-sectional view similar to FIG. 7 but showing the handle in the first rotatable position wherein the descender panel is in the retracted position.

In operation, the handle 50 can be rotated from the first rotatable position shown in FIGS. 5 and 7 approximately 90 degrees to the second rotatable position shown in FIGS. 6 and 9. Rotation of the handle from the first rotatable position to the second rotatable position is transmitted and translated through the link mechanism, and particularly through the link driver 76, the floating link 74, the rocker arm link 70 and the elongated link 72, to vertical movement of the descender panel 36. In particular, movement of the handle 50 from the first rotatable position to the second rotatable position translates into vertical movement of the descender panel 36 from the deployed position to the retracted position. Particularly, the descender panel 36 moves along the track defined by the trimming edge 58 and the guide member 98 disposed on or as part of the partition panel 32.

More specifically, in the illustrated embodiment, the handle 50 is rotated a first rotatable direction (i.e., counterclockwise in FIG. 5), which causes the link driver 76 to likewise rotate in the first rotatable direction (i.e., counterclockwise in FIG. 5). Rotation of the link driver 76 is transmitted and reversed by the floating link 74 connecting the link driver 76 and the rocker arm link 70. Accordingly, the floating link 74 causes the rocker arm link 70 to rotate in a second rotatable direction (i.e., clockwise in FIG. 5) that is opposite the first rotatable direction such that the end 70b of the rocker arm 70 pivots from the lowered position shown in FIG. 5 to the elevated position shown in FIG. 6. This change in elevation is transmitted to the descender panel 36 by the elongated link 72 so as to move the descender panel 36 from the deployed position of FIG. 5 to the retracted position of FIG. 6. The track comprised of the trimming edge 58 and the guide member 98 maintains movement of the descender panel 36 only linearly, and particularly only linearly up and down in the illustrated embodiment.

The descender panel 36 can be held in the deployed position by the magnets 86 and 90 being in registry with one another and/or the magnets 100, 102 being in registry with one another. When the handle 50 is moved to the second rotatable position, the position of the handle 50 and the position of the descender panel 36 can be held by the magnets 86 and 90 and/or the magnets 100, 102 being in registry with one another. As already mentioned, a further feature of the magnets is the provision of feedback to the user of or operator of the handle 50. Subsequently, the handle 50 can be returned by rotation back to the first rotatable position. Such movement is against transmitted and translated through the link mechanism 54, but in reverse so that the descender panel 36 moves from the retracted position back to the deployed position.

More particularly, in the illustrated embodiment, the handle 50 is rotated in the second rotatable direction (i.e., clockwise in FIG. 6), which causes the link driver to likewise rotate in the second rotatable direction (i.e., clockwise in FIG. 6). Rotation of the link diver 76 is transmitted and reversed by the floating link 74 such that the floating link 74 causes the rocker arm link 70 to rotate in the first rotatable direction (i.e., counterclockwise in FIG. 6). This results in the end 70b moving from the elevated position of FIG. 6 to the lowered position of FIG. 5. The change is elevation is again transmitted to the descender panel 36 by the elongated link but this time to move the descender panel 36 from the retracted position of FIG. 6 to the deployed position of FIG. 5. Again, the track 58, 98 maintains movement of the descender panel only linearly (i.e., up and down in the illustrated embodiment).

Advantageously, the mechanical structure of the door assembly 30 is relatively simple and thus does not require a complex mechanism and/or require a large space to operate. It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A door assembly for an aircraft, comprising
a partition panel disposed laterally within a fuselage of the aircraft;
a descender panel movably secured to a lower end of the partition panel for selectively closing an aisle opening defined below the partition panel; and
a handle disposed on the partition panel and operatively connected to descender panel through a link mechanism such that rotation of the handle is translated into linear movement of the descender panel to move the descender panel between a retracted position and a deployed position,
wherein the link mechanism includes:
a rocker arm link having a first end, a second end and a fixed pivot location wherein the rocker arm link is fixedly and pivotally connected to the partition panel and wherein the fixed pivot location is disposed between the first end and the second end of the rocker arm link; and
an elongated link having a first end and a second end, wherein a first end of the elongated link is rotatably connected to the second end of the rocker arm link and a second end of the elongated link is rotatably connected to the descender panel such that rotation of the handle moves the connected descender panel in only a vertical direction towards or away from the aisle opening, and
wherein the first end of the rocker arm link is operatively connected to the handle such that rotation of the handle rotates the rocker arm link about the fixed pivot location and rotates the first end of the elongated link about the second end of the rocker arm link to thereby vertically move the elongated link and the descender panel connected thereto.

2. The door assembly of claim 1 wherein the partition panel defines a track and the descender panel is received in the track for linear guiding sliding movement of the descender panel between the retracted and deployed positions.

3. The door assembly of claim 2 wherein the partition panel has an inside lateral edge and the door assembly includes a trimming edge covering the inside lateral edge and defining the track, and wherein the link mechanism is housed within a cavity defined by the partition panel.

4. The door assembly of claim 3 wherein the partition panel includes a guide member spaced laterally from the trimming edge, the guide member further defining the track.

5. The door assembly of claim 1 wherein the link mechanism further includes:
a floating link having a first end rotatably connected to the handle such that rotation of the handle moves the first end of the floating link, and a second end rotatably connected to the first end of the rocker arm link to transmit rotational movement of the handle into rotational movement of the rocker arm link about the fixed pivot point.

6. The door assembly of claim 5 wherein the link mechanism further includes:
a link driver fixedly mounted to the handle for corotation therewith, the first end of the floating link rotatably connected to a distal end of the link driver.

7. The door assembly of claim 6 wherein the handle is rotatable between a first rotatable position corresponding to the deployed position of the descender panel and a second rotatable position corresponding to the retracted position of the descender panel.

8. The door assembly of claim 7 wherein the link driver is formed of a magnetically attractive material and the partition panel includes a first magnet and a second magnet, the first magnet arranged such that the first magnet is aligned with the link driver when the descender panel is in the deployed position, the second magnet arranged such that the second magnet is aligned with the link driver when the descender panel is in the retracted position and a magnetic attraction between the second magnet and the link driver holds the handle in the second rotatable position.

9. The door assembly of claim 7 wherein nonmetallic stops are arranged on the partition panel to limit rotational travel of the handle to movement beyond the first and second rotatable positions.

10. The door assembly of claim 1 further including at least one magnet arranged on the partition panel, the link mechanism moving relative to the at least one magnet as the handle is rotated and the link mechanism moves due to such handle rotation, a link driver of the link mechanism aligned with the at least one magnet for magnetic holding by the at least one magnet when the descender panel is in at least one of the retracted position or the deployed position.

11. The door assembly of claim 1 further including at least one magnet disposed on the partition panel and a magnetically attractive boss disposed on the descender panel for movement with the descender panel, the magnetically attractive boss moving relative to the at least one magnet as the descender panel moves between the retracted position and the deployed position, the magnetically attractive boss in registry with the at least one magnet when the descender panel is in at least one of the deployed position or the retracted position.

12. The door assembly of claim 1 wherein a bulkhead is arranged within the fuselage, the partition panel slidably secured to the bulkhead via track members for lateral movement relative to the bulkhead and the fuselage between an open position wherein the partition panel is retracted radially outwardly relative to the fuselage and a closed position wherein the partition panel is projected radially inwardly relative to the fuselage, the partition panel also moving slightly vertically when moved between the open position and the closed position to accommodate a round cross-section of the fuselage.

13. The door assembly of claim 12 wherein the partition panel is a first partition panel and the door assembly includes a second partition panel disposed laterally within a fuselage of the aircraft for sliding movement toward one another when the first and second partition panels are moved to respective closed positions and sliding movement away from one another when the first and second partition panels are moved to respective open positions.

14. An aircraft door assembly, comprising:
first and second rigid partitions disposed laterally within an aircraft fuselage;
first and second descender panels movably associated respectively with the first and second rigid partitions for closing an aisle opening defined below the first and second rigid partitions when the first and second rigid partitions are closed together; and
first and second actuating handles rotatably mounted respectively on the first and second partition panels, the first handle operatively connected to the first descender panel through a first link mechanism to translate rotation of the first handle into linear vertical movement of the first descender panel, the second handle operatively connected to the second descender panel through a second link mechanism to translate rotation of the second handle into linear vertical movement of the second descender panel,
wherein each of the first and second link mechanisms includes:
a link driver fixedly secured and extending from a corresponding one of the first and second actuating handles;
a floating link having a first end connected to a distal end of the link driver and a second end;
a rocker arm link having a fixed pivot location with a first end connected to the second end of the floating link and a second end, wherein the fixed pivot location is disposed between the first end and the second end of the rocker arm link; and
an elongated link having a first end connected to the second end of the rocker arm link and a second end connected to a corresponding one of the first and second descender panels, wherein rotation of a corresponding actuating handle rotates the first end of the elongated link about the second end of the rocker arm link and moves the corresponding descender panel in only a vertical direction towards or away from the corresponding aisle opening.

15. The aircraft door assembly of claim 14 further including:
first and second trimming edges mounted respectively on inside lateral edges of the first and second partitions, each of the first and second trimming edges defining a track that guides movement of a corresponding one of the first and second descender panels.

16. An aircraft door mechanism, comprising
an actuating handle rotatably mounted on a partition panel laterally disposed within a fuselage of an aircraft;
a descender panel slidably mounted on the partition panel; and
a link mechanism operatively connecting the actuating handle and the descender panel such that rotation of the handle is translated by the link mechanism to sliding movement of the descender panel,
wherein the link mechanism includes a rocker arm link having a first end rotatably connected to the handle and a second end rotatably connected to the descender panel with a fixed pivot located between the first and second end, the rocker arm link rotatably connected to the partition panel at the fixed pivot location which is disposed between the first end and the second end of the rocker arm link, wherein rotation of the actuating handle rotates a first end of an elongated link about the second end of the rocker arm link, and
wherein rotation of the actuating handle moves the descender panel in only a vertical direction towards or away from an aisle opening.

17. The aircraft door mechanism of claim 16 wherein the descender panel is complementarily shaped to fit a shape of the aisle opening defined within the fuselage of the aircraft.

* * * * *